United States Patent
Barbier et al.

(10) Patent No.: US 8,284,280 B2
(45) Date of Patent: Oct. 9, 2012

(54) PINNED PHOTODIODE CMOS IMAGE SENSOR WITH A LOW SUPPLY VOLTAGE

(75) Inventors: Frédéric Barbier, Grenoble (FR); Yvon Cazaux, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 907 days.

(21) Appl. No.: 11/959,023

(22) Filed: Dec. 18, 2007

(65) Prior Publication Data

US 2008/0170147 A1 Jul. 17, 2008

(30) Foreign Application Priority Data

Dec. 21, 2006 (FR) ...................................... 06 55830

(51) Int. Cl.
*H04N 3/14* (2006.01)
(52) U.S. Cl. ...... 348/294; 348/300; 348/308; 250/208.1
(58) Field of Classification Search ........................ None
See application file for complete search history.

(56) References Cited

U.S. PATENT DOCUMENTS

| | | | |
|---|---|---|---|
| 5,296,696 A * | 3/1994 | Uno | 250/208.1 |
| 6,963,372 B1 * | 11/2005 | Hiyama et al. | 348/302 |
| 2001/0005227 A1 * | 6/2001 | Egawa et al. | 348/304 |
| 2002/0057355 A1 * | 5/2002 | Sakuragi | 348/308 |
| 2003/0164443 A1 * | 9/2003 | Henderson | 250/208.1 |
| 2004/0178324 A1 | 9/2004 | Scott-Thomas | |
| 2005/0121519 A1 | 6/2005 | Shinohara | |
| 2006/0007329 A1 * | 1/2006 | Panicacci | 348/241 |

OTHER PUBLICATIONS

French Search Report from French Patent Application No. 06/55830 filed Dec. 21, 2006.

* cited by examiner

*Primary Examiner* — Chieh M Fan
*Assistant Examiner* — Dwight C Tejano
(74) *Attorney, Agent, or Firm* — Wolf, Greenfield & Sacks, P.C.

(57) ABSTRACT

A device for controlling an image sensor including at least one photosensitive cell including a photodiode capable of discharging into a sense node via a first MOS transistor, the sense node being connected to the gate of a second MOS transistor having its source connected to a processing system. The device includes a bias circuit capable of increasing the voltage of the source during the discharge of the photodiode into the sense node.

20 Claims, 4 Drawing Sheets

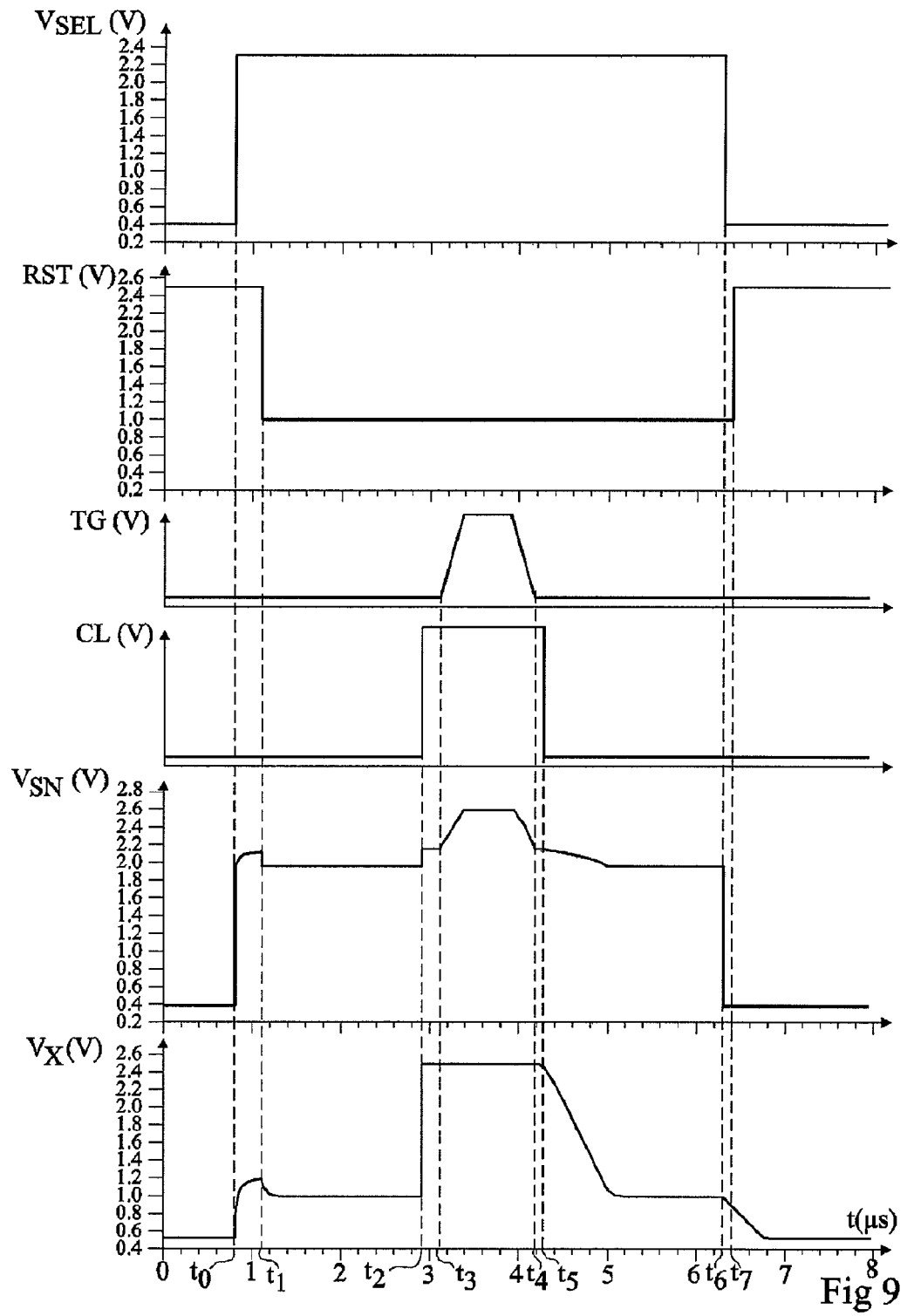
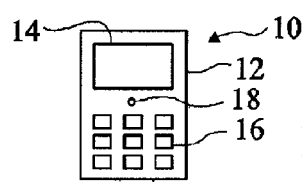
Fig 9
Fig 10

PINNED PHOTODIODE CMOS IMAGE SENSOR WITH A LOW SUPPLY VOLTAGE

BACKGROUND OF THE INVENTION

1. Field of the Invention

The present invention relates to the control of a monolithic photosensitive cell of an image sensor for use in image shooting devices such as, for example, film cameras, camcorders, digital photographic devices, or again cellular phones. More specifically, the present invention relates to a semiconductor-based photosensitive cell.

2. Discussion of the Related Art

FIG. 1 schematically illustrates the circuit of a photosensitive cell PIX, or pixel, of an array of photosensitive cells of an image sensor. With each photosensitive cell of the array are associated a precharge device and a read device. The precharge device is formed of an N-channel MOS transistor $M_1$, interposed between a supply rail $V_{RT}$ and a sense node SN. The gate of precharge transistor $M_1$ is capable of receiving a precharge control signal RST. The read device is formed of the series connection of first and second N-channel MOS transistors $M_3$, $M_2$. The source of first read transistor $M_2$ is connected to an input terminal X of a processing circuit (not shown). The drain of second read transistor $M_3$ is connected to supply rail $V_{RT}$. The gate of first read transistor $M_2$ is connected to sense node SN. The gate of second read transistor $M_3$ is capable of receiving a read signal READ. The photosensitive cell comprises a photodiode D having its anode connected to a reference voltage source GND and having its cathode connected to node SN via an N-channel charge transfer transistor $M_4$. The gate of transfer transistor $M_4$ is capable of receiving a charge transfer control signal TG. Generally, signals READ, RST, and TG are provided by control circuits not shown in FIG. 1 and may be provided to all the photosensitive cells of a same row of the cell array.

Sense node SN function as a region for storing the charges originating from photodiode D, the apparent capacitance at sense node SN being formed of the capacitances of the sources of transistors $M_1$ and $M_4$, of the input capacitance of transistor $M_2$, as well as on the set of stray capacitances present at node SN. According to an alternative, a specific component, for example, a diode or a capacitor, may be connected to sense node SN to ensure the storage function.

FIG. 2 shows an example of a timing diagram of signals READ, RST, TG and of voltage $V_{SN}$ at node SN for a read cycle of photosensitive cell PIX of FIG. 1. Signals READ, RST, and TG are binary signals varying between high and low signals which may be different for each of the signals.

Between two read cycles of the photosensitive cell, during the carrier integration phase, signal TG is low. Transfer transistor $M_4$ is thus turned off. The lighting causes the forming and the storage of charges at the level of photodiode D. Further, signal RST is high. Precharge transistor $M_1$ is thus on. Voltage $V_{SN}$ is thus substantially equal to voltage $V_{RT}$.

At a time $t_0$, the array row containing the photosensitive cell to be read is selected by setting signal READ to the high level. The precharge of sense node SN is interrupted by setting signal RST to the low state at time $t_1$, thus turning off precharge transistor $M_1$. Voltage $V_{SN}$ at sense node SN is then set to a precharge level $V_{RST}$ which is slightly lower than voltage $V_{RT}$ due to a coupling with precharge transistor $M_1$. Precharge level $V_{RST}$ is generally disturbed by noise essentially originating from the thermal noise of the channel of precharge transistor $M_1$. This noise is sampled and maintained at sense node SN on turning off of precharge transistor $M_1$. Precharge level $V_{RST}$ is then stored outside of photosensitive cell PIX via read transistors $M_2$, $M_3$.

At time $t_2$, signal TG switches high. Voltage $V_{SN}$ rises from $V_{RST}$ to $V_{RST}+V_U$ due to the coupling with transistor $M_4$. Transfer transistor $M_4$ is then on, which enables transferring the charges stored in photodiode D to sense node SN, causing a decrease in voltage $V_{SN}$ down to $V_{RD}+V_U$. Photodiode D is designed so that all the charges stored therein are transferred to sense node SN. Once the charge transfer is over, signal TG switches low at time $t_3$, thus enabling insulating again photodiode D and restarting a cycle of forming and storage of charges resulting from the lighting. By a coupling effect with transistor $M_4$, voltage $V_{SN}$ then decreases to stabilize at a desired signal level $V_{RD}$, smaller than level $V_{RST}$, which depends on the number of charges transferred to sense node SN. Wanted signal level $V_{RD}$ is then read via read transistors $M_2$, $M_3$. Like precharge level $V_{RST}$, desired signal level $V_{RD}$ is especially disturbed by the thermal noise of the channel of precharge transistor $M_1$ which has been sampled and maintained at sense node SN. The subtraction of signals $V_{RD}$ and $V_{RST}$ by the processing circuit enables eliminating the noise of precharge transistor $M_1$ by a double correlated sampling. Once the reading is over, signal RST is set to the high state at time $t_4$ to precharge sense node SN again. Finally, at time $t_5$, signal READ is set to the low state to deselect the photosensitive cell. According to a variation, the switchings between high and low levels of signal TG are performed in ramps.

FIG. 3 illustrates, in a partial simplified cross-section view, a monolithic embodiment of the assembly of photodiode D and of transfer transistor $M_4$ of FIG. 1. These elements are formed in the same active area of a lightly-doped semiconductor substrate 1 of a first conductivity type, for example, type P ($P^-$). This substrate, for example, corresponds to an epitaxial layer on a silicon wafer which forms reference plane GND. The active area is delimited by field insulation areas 2, for example, made of silicon oxide ($SiO_2$), and corresponds to a well 3 of the same conductivity type as underlying substrate 1, but more heavily-doped. Above the surface of well 3 is formed an insulated-gate structure 4 possibly provided with lateral spacers. On either side of gate 4, at the surface of well 3, are located source and drain regions 5 and 6 of the opposite conductivity type, for example, N. Drain region 6, to the right of gate 4, is heavily doped ($N^+$). Source region 5 is formed of a much greater surface area than drain region 6 and forms with underlying well 3 the junction of photodiode D. Gate 4 and drain 6 are solid with metallizations (not shown) which enable putting these regions respectively in contact with transfer control signal TG and the gate of transistor $M_2$ (node SN), respectively. The structure is completed with heavily-doped P-type regions 8 and 9 ($P^+$). Regions 8 and 9, which underly areas 2, are connected with the reference potential or ground via well 3 and substrate 1. Photodiode D is of so-called pinned or fully depleted photodiode type and comprises, at the surface of its source 5, a shallow P-type region 7 more heavily doped ($P^+$) than well 3. Region 7 is in lateral (vertical) contact with region 8. It is thus permanently maintained at the reference voltage. Photodiode D is called a depleted or pinned photodiode since the voltage of region 5 of the photodiode is, in the absence of lighting, set by the sole dopant concentrations of regions 3, 5, 7.

FIG. 4 schematically illustrates the voltage levels of the different regions of FIG. 2. The curve in stripe-dot lines illustrates the state of the system just after time $t_2$, and the curve in full line illustrates the state of the system just after time $t_3$. Heavily-doped P-type regions 7, 8, and 9 are permanently maintained at the reference potential or ground, for example, 0 V. Just after time $t_2$, region 5 of photodiode D, completely charged, is at a voltage $V_{DC}$. Transistor $M_4$ is on. Channel region 3 of transistor $M_4$ is at a voltage $V_T$. Region 6 corresponding to node SN is at the level of precharge level $V_{RST}+V_U$ due to the coupling with transistor $M_4$. Between times $t_2$ and $t_3$, the charges stored in region 5 are transferred to region 6, causing a decrease in the voltage of region 6 and an increase in the voltage of region 5. After time $t_3$, the charges stored in photodiode D being completely transferred to node SN, photodiode D reaches a so-called quiescent depletion level $V_D$ set by the sole characteristics of diode D. Transfer transistor $M_4$ being off, channel region 3 is at 0 V. Region 6 is at desired signal level $V_{RD}$. Region 5 of photodiode D then forms an empty voltage well which fills up again according to the lighting of the photodiode.

Generally, the high level of transfer control signal TG applied to the gate of transfer transistor $M_4$ is such that the voltage in channel region 3 of transistor $M_4$ is intermediate between depletion level $V_D$ and desired signal level $V_{RD}$ increased by voltage $V_U$ due to the coupling with transistor $M_4$. To ensure a proper transfer of the charges, it is generally necessary to provide a sufficient margin M between voltage levels $V_D$ and $V_T$. As an example, for a supply voltage $V_{RT}$ of 3 V, voltage $V_D$ is on the order of 1.5 V and margin M is generally selected to be greater than 0.5 V. Voltage $V_T$ thus defines the swing of voltage $V_{SN}$ which substantially corresponds to the difference between voltages $V_{RST}+V_U$ and $V_T$.

For increasingly dense technologies with photosensitive cells of small dimensions, it is desired to decrease supply voltage $V_{RT}$ and, generally, the high levels of the transistor control signals.

However, several difficulties arise when supply voltage $V_{RT}$ is decreased. A first difficulty is that the decrease of voltage $V_{RT}$ translates as a decrease in voltage $V_{RST}$. With the previously-described image sensor controlling method, it can then be difficult, or even impossible, to adjust voltages $V_D$ and $V_T$ to ensure the proper transfer of the charges of photodiode D to sense node SN while keeping an appropriate swing of voltage $V_{SN}$ and an appropriate swing of the photodiode voltage.

Another difficulty is to ensure for transistor $M_2$ to operate in linear state across the entire swing of voltage $V_{SN}$ to ensure for the voltage at node X to be a linear reproduction of voltage $V_{SN}$. Transistor $M_2$ is said to be in linear state when the ratio of voltages $V_X$ and $V_{SN}$ varies only slightly. According to the level of supply $V_{RT}$, the linear state of transistor $M_2$ corresponds to a specific range of voltage $V_{SN}$. With the previously-described image control method, it may be difficult, or even impossible, when $V_{RT}$ is desired to be decreased, to have the range of voltage $V_{SN}$ for which transistor $M_2$ is in linear state correspond to the range of voltage $V_{SN}$ for which a proper charge transfer from photodiode D to sense node SN is obtained.

SUMMARY OF THE INVENTION

In an embodiment, the present invention aims at a pinned photodiode image sensor with a decreased power supply providing an appropriate charge transfer from the photodiode to the sense node while keeping proper linearity properties.

Another object of an embodiment of the present invention comprises providing an image sensor comprising a limited number of transistors.

A method for controlling a pinned photodiode image sensor with a decreased power supply is also disclosed.

An aspect of the present invention provides a device for controlling an image sensor comprising at least one photosensitive cell comprising a photodiode capable of discharging into a sense node via a first MOS transistor, the sense node being connected to the gate of a second MOS transistor having its source connected to a processing system. The device comprises a bias circuit capable of increasing the voltage of said source during the discharge of the photodiode into the sense node.

According to an embodiment of the present invention, the device further comprises a third MOS transistor connecting the sense node to a circuit for providing a reference voltage and a fourth MOS transistor connecting the drain of the second transistor to said circuit for providing the reference voltage, and means capable of successively turning off the third transistor and of turning on the fourth transistor before discharge of the photodiode into the sense node.

According to an embodiment of the present invention, the circuit for providing the reference voltage is capable of temporarily increasing the reference voltage on turning off of the third transistor.

According to an embodiment of the present invention, the processing system is capable of storing the voltage at the source of the second transistor, before and after discharge of the photodiode towards the sense node.

According to an embodiment of the present invention, the drain of the second MOS transistor is connected to a circuit for providing a reference voltage, the device comprising a third MOS transistor connecting the sense node to a circuit for providing a variable voltage, and means capable of successively turning on the third transistor, increasing the variable voltage up to a level greater than the reference voltage, and turning off the third transistor before discharge of the photodiode into the sense node.

According to an embodiment of the present invention, the bias circuit comprises a switch connecting the source of the second transistor to a source of a voltage greater than the reference voltage decreased by the gate-source voltage of the second transistor.

Another aspect of the present invention provides an optical device, especially a film camera, a camcorder, a cellular phone, or a digital photographic device, comprising an image sensor and a device for controlling the image sensor such as defined hereabove.

Another aspect of the present invention provides a method for controlling a photosensitive cell comprising a photodiode capable of discharging into a sense node via a first MOS transistor, the sense node being connected to the gate of a second MOS transistor having its source connected to a processing system. The method comprises increasing the voltage of said source during the discharge of the photodiode into the sense node.

According to an embodiment of the present invention, the photosensitive cell further comprises a third MOS transistor connecting the sense node to a circuit for providing a reference voltage and a fourth MOS transistor connecting the drain of the second transistor to said circuit for providing the reference voltage, the method comprising successively turning off the third transistor and of turning on the fourth transistor before the discharge of the photodiode into the sense node.

According to an embodiment of the present invention, the drain of the second MOS transistor is connected to a circuit for providing a reference voltage, the photosensitive cell comprising a third MOS transistor connecting the sense node to a circuit for providing a variable voltage, the method comprising the steps of successively turning on the third transistor, increasing the variable voltage up to a level higher than the reference voltage, and turning off the third transistor before discharge of the photodiode to the sense node.

According to an embodiment of the present invention, during the discharge of the photodiode into the sense node, the source of the second transistor is connected to a circuit for providing a voltage greater than the reference voltage decreased by the gate-source voltage of the second transistor.

The foregoing and other objects, features, and advantages of embodiments of the present invention will be discussed in detail in the following non-limiting description of specific embodiments in connection with the accompanying drawings.

BRIEF DESCRIPTION OF THE DRAWINGS

FIG. 9 is an example of timing diagrams of voltages characteristic of the circuit of FIG. 8 for an example of a control method according to an embodiment of the present invention; and FIG. 10 very schematically shows a cell phone comprising an image sensor according to an embodiment of the present invention.

DETAILED DESCRIPTION

Figure 1:
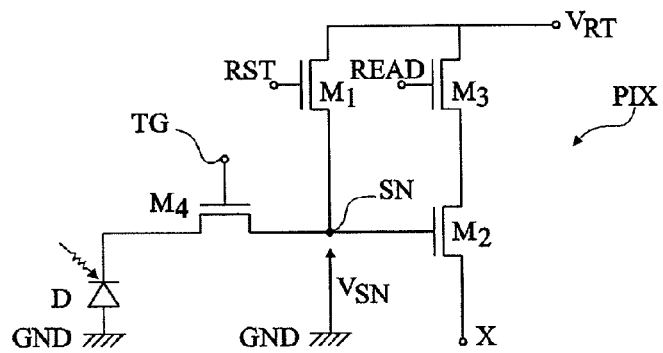
FIG. 1, previously described, shows an electric diagram of a photosensitive cell.
Figure 2:
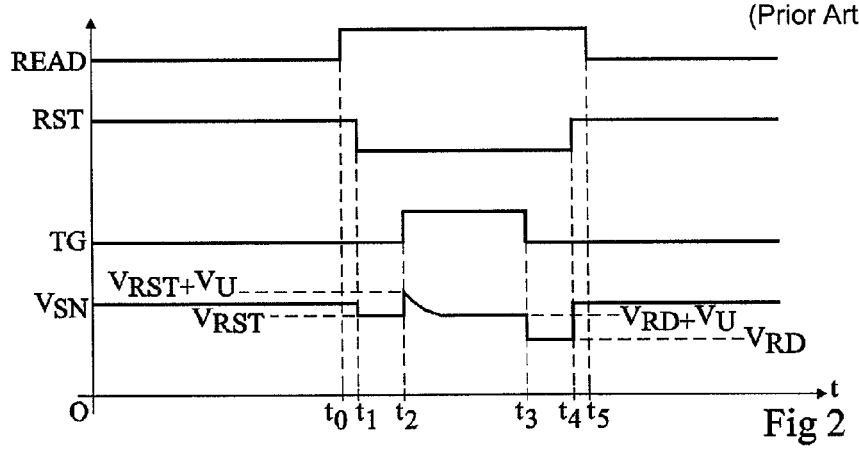
FIG. 2, previously described, illustrates a timing diagram of voltages characteristic of FIG. 1.
Figure 3:
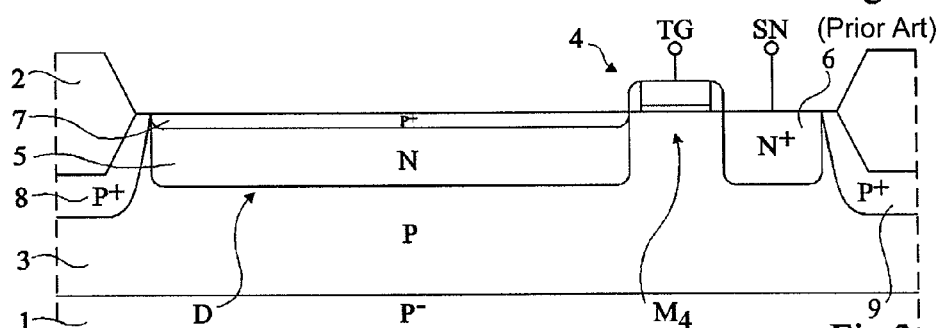
FIG. 3, previously described, shows a partial simplified cross-section view of a portion of the circuit of FIG. 1 made in monolithic form.

For clarity, the same elements have been designated with the same reference numerals in the different drawings and, further, as usual in the representation of integrated circuits, the various drawings are not to scale.

In an embodiment, the present invention comprises separating the charge transfer problem from the problem of the linear operation of transistor $M_2$ on reading of the signal from the sense node. For this purpose, the fact that, just after the charge transfer to the sense node, the sense node is at a floating potential, is used. An embodiment of the present invention then comprises temporarily increasing voltage $V_{SN}$ during the charge transfer phase by capacitive coupling effect, to ease the transfer of charges from the photodiode to the sense node. Further, the circuit parameters are adjusted to ensure that, during a read cycle, outside of the charge transfer phase, transistor $M_2$ is in linear state. In order to obtain an efficient capacitive coupling effect, it is provided to connect the source of transistor $M_2$ directly to the read column without interposition of an intermediate MOS transistor.

Figure 5:
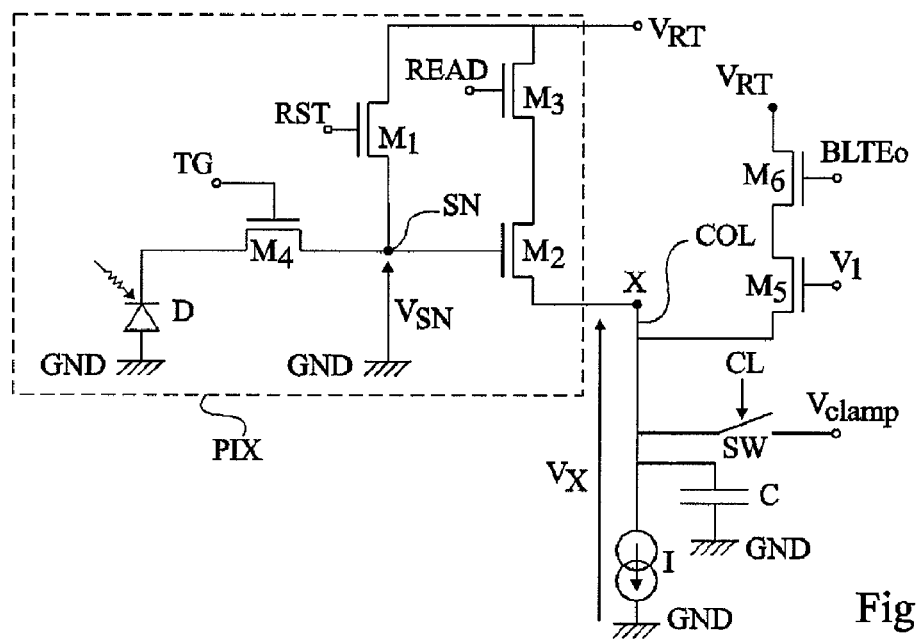
FIG. 5 shows a first example of embodiment of an image sensor according to an embodiment of the present invention.

FIG. 5 shows a first example of an image sensor according to an embodiment of the present invention, only one photosensitive cell PIX being shown. The structure of photosensitive cell PIX is identical to that shown in FIG. 1. Each photosensitive cell PIX of a same image sensor column is connected to a read column COL.

The read column is connected to a source of a charge voltage $V_{clamp}$ via a switch SW controlled by a signal CL. Switch SW may be formed from one or several N- or P-type MOS transistors. The assembly of stray capacitances seen from read column COL is shown in FIG. 5 by a capacitor C having a terminal connected to column COL and having its other terminal connected to ground GND. Read column COL is connected to a terminal of a current source I having its other terminal connected to ground GND.

According to a variation of the first example of an image sensor according to an embodiment of the present invention which will be described in further detail hereafter, read column COL is connected to supply voltage $V_{RT}$ via two series-assembled MOS transistors $M_5$ and $M_6$. The gate of transistor $M_5$ is capable of receiving a control signal $V_1$ and the gate of transistor $M_6$ is capable of receiving a control signal BLTEo.

According to another variation of the first example of an image sensor according to an embodiment of the present invention, transistor $M_1$ is connected to a supply voltage which is different from supply voltage $V_{RT}$ and which can be provided by a separate circuit. Moreover, transistor $M_1$ can be connected to a supply voltage which is different from supply voltage $V_{RT}$ and which can be variable.

Figure 6:
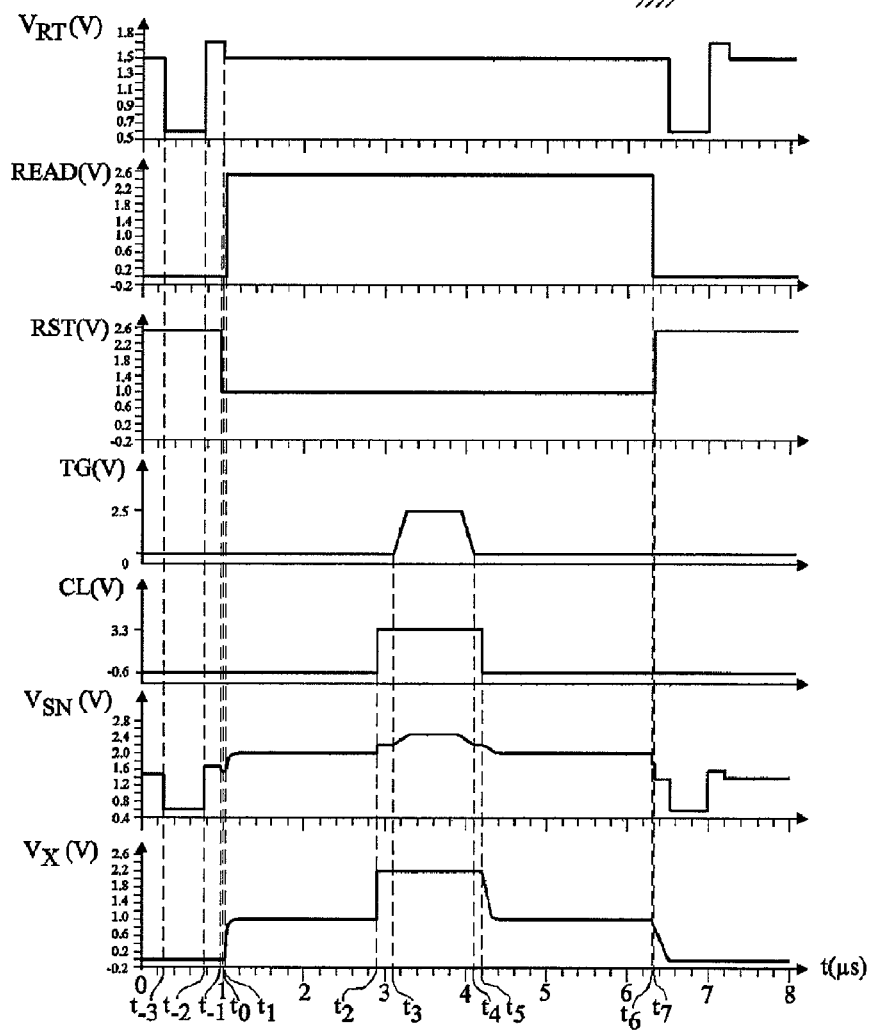
FIG. 6 is a timing diagram of voltages characteristic of the circuit of FIG. 5 for a first example of a control method according to an embodiment of the present invention.

FIG. 6 shows a first example of a method for controlling according to an embodiment of the present invention the image sensor of FIG. 5, where column COL is not connected to voltage $V_{RT}$ by transistors $M_5$, $M_6$ and switch SW is formed by an N-type MOS transistor having its gate receiving signal CL. Such a method is adapted to the case where supply voltage $V_{RT}$ is desired to be greatly decreased, for example, down to average values on the order of from 1.5 V to 1.7 V. The first example of a control method according to an embodiment of the present invention is adapted to an image sensor for which supply voltage $V_{RT}$ can be temporarily modified. In FIG. 6, reference numerals $t_{-3}$, $t_{-2}$, $t_{-1}$, $t_0$ to $t_7$ represent the successive times. Further, in FIG. 6, the numerical values of the voltages have been obtained by simulation, considering that the capacitance of capacitor C is on the order of 900 fF, that current source I provides a 2.4-µA current, and that transistors $M_1$, $M_2$, $M_3$, and $M_4$ respectively have a ratio of their drain-source distance to their channel distance perpendicular to the drain-source distance equal to 0.485/0.22, 0.6/0.22, 0.35/0.22, and 0.36/0.32.

At the beginning of a read cycle, supply voltage $V_{RT}$ is at a normal operating level, for example, 1.5 V. Signal RST is at the high level, for example 2.5 V. Signal TG is at the low level, for example ranging between 0 and −1 V, and equal to −0.6 V in FIG. 6, and signal CL is at the low level, for example, 0 V. Transistor $M_1$ being on, voltage $V_{SN}$ is substantially equal to $V_{RT}$. Signal READ is low, for example, 0 V. Transistor $M_3$ is thus off. Voltage $V_X$ at node X is then substantially equal to 0 V, capacitor C being discharged through current source I.

At time $t_{-3}$, supply voltage $V_{RT}$ switches to a low level, for example, to 0.6 V. Voltage $V_{SN}$ then decreases to 0.6 V.

At time $t_{-2}$, supply voltage $V_{RT}$ switches to a high level, higher than the normal operating level, for example, 1.7 V. Voltage $V_{SN}$ then follows voltage $V_{RT}$.

At time $t_{-1}$, signal RST switches from the high level to the low level, for example ranging between 0 and 1 V, and equal to 1 V in FIG. 6. Transistor $M_1$ is then off. By capacitive coupling effect, voltage $V_{SN}$ slightly decreases. Sense node SN is then floating.

At time $t_0$, supply voltage $V_{RT}$ switches from the high level to the normal operating level, for example, 1.5 V.

At time $t_1$, signal READ switches from the low level to the high level, for example, 2.5 V. Transistor $M_3$ being on, a current flows through transistor $M_2$. Capacitor C charges, causing an increase in voltage $V_X$ at node X. Voltage $V_{SN}$ then rises due to three capacitive coupling effects. The first effect is due to the stray capacitance between the conductive track transmitting signal READ and sense node SN, which causes an increase in voltage $V_{SN}$ on switching of signal READ from the low level to the high level. The second effect is due to the stray capacitance between the drain and the gate of transistor $M_2$ which causes an increase in voltage $V_{SN}$ when the voltage at the source of transistor $M_3$ increases towards $V_{RT}$. The third effect, which is the most significant effect, is due to the stray capacitance between the gate and the source of transistor $M_2$ which causes an increase in voltage $V_{SN}$ when voltage $V_X$ increases due to the charge of capacitor C. Voltage $V_{SN}$ then settles at a precharge level. Since transistor $M_2$ operates in linear state, voltage $V_X$ follows voltage $V_{SN}$. Voltage $V_X$ is then stored by a processing circuit, not shown, connected to the column. For the first example of control method, transistor $M_2$ operates in linear state when voltage $V_{SN}$ ranges between 1.25 V and 2.1 V.

At time $t_2$, signal CL switches from the low level to the high level, for example, to 3.3 V. Voltage $V_X$ then switches to 2.5 V, causing an increase in voltage $V_{SN}$ by a capacitive coupling effect due to the stray capacitance between the gate and the source of transistor $M_2$.

At time $t_3$, signal TG increases from the low level to the high level, for example, to 2.5 V, in an ascending ramp. This causes, by a capacitive coupling effect due to the stray capacitance between the gate and the drain of transistor $M_1$, an increase in voltage $V_{SN}$. The charges stored in photodiode D are then transferred to sense node SN. After a holding at the high level, signal TG decreases, in a descending ramp, to reach at time $t_4$ the low level. Voltage $V_{SN}$ follows signal TG and settles at a level which depends on the number of transferred charges. In FIG. 6, the level reached by voltage $V_{SN}$ after the charge transfer is identical to that just before time $t_2$, which reflects the absence of charges stored at the level of photodiode D.

At time $t_5$, signal CL switches from the high level to the low level. A new balance establishes and voltages $V_X$ and $V_{SN}$ decrease. Voltage VSN settles at a wanted voltage representative of the number of transferred charges. Since transistor $M_2$ operates in linear state, voltage $V_X$ follows voltage $V_{SN}$. Voltage $V_X$ is then stored by the processing circuit.

At time $t_6$, signal READ switches from the high level to the low level. Voltage $V_{SN}$ decreases by a capacitive coupling effect due to the stray capacitance between the conductive track transmitting signal READ and sense node SN. Since transistor $M_3$ is off, voltage $V_X$ decreases on discharge of capacitor C through current source I.

At time $t_7$, signal $R_{ST}$ switches from the low level to the high level, causing the decrease of voltage $V_{SN}$ to voltage $V_{RT}$. The read cycle is then over.

Figure 4:
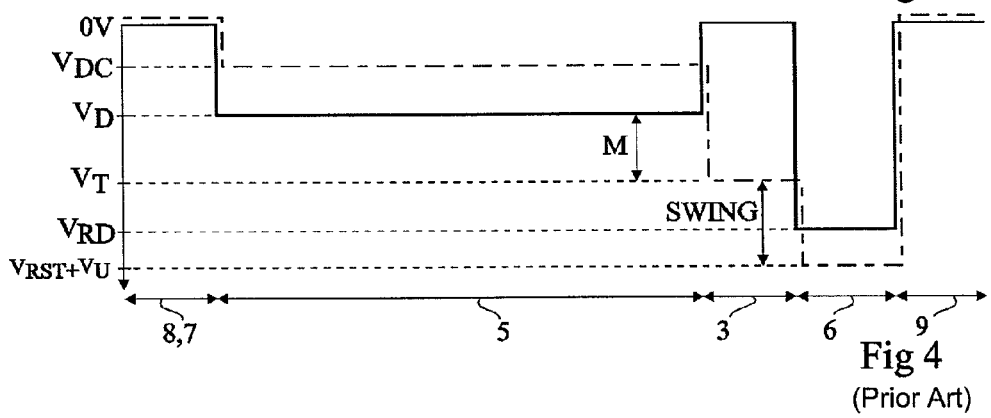
FIG. 4, previously described, schematically illustrates voltage levels in the structure of FIG. 3.

Between times $t_2$ and $t_5$, the setting of column COL to voltage $V_{RT}$ enables temporarily increasing, by capacitive coupling effect, the voltage at sense node SN which is floating. This eases the charge transfer from photodiode D to sense node SN by increasing the swing of voltage $V_{SN}$ such as defined in relation with FIG. 4. The stages of voltage $V_{SN}$ outside of the charge transfer, that is, during read phases for which voltage $V_X$ is stored, may be controlled by the high and low levels of signal READ, and by the value of voltage $V_X$ when signal READ switches from the low level to the high level. Outside of the charge transfer phase, the voltage at sense node SN is maintained at an appropriate voltage for transistor $M_2$ to operate in linear state. Voltage $V_{clamp}$ is adjusted according to the range of voltage $V_{SN}$ during read phases so that, during the charge transfer, voltage $V_{SN}$ is properly increased.

The setting to a low level of supply voltage $V_{RT}$, between times $t_{-2}$ and $t_{-1}$, enables ensuring that, between times $t_{-2}$ and $t_{-1}$, transistor $M_1$ is perfectly conductive to correctly carry off all the charges present at sense node SN. Indeed, when voltage $V_{RT}$ is at the normal operating level, and signal RST is high, the biasing of transistor $M_1$ may be such that transistor $M_1$ is only partially on. However, although the carrying off of the charges present at sense node SN is ensured properly even if transistor $M_1$ is only partially conductive, it may not be necessary to provide the setting to a low level of supply voltage $V_{RT}$ between times $t_{-2}$ and $t_{-1}$.

Figure 7:
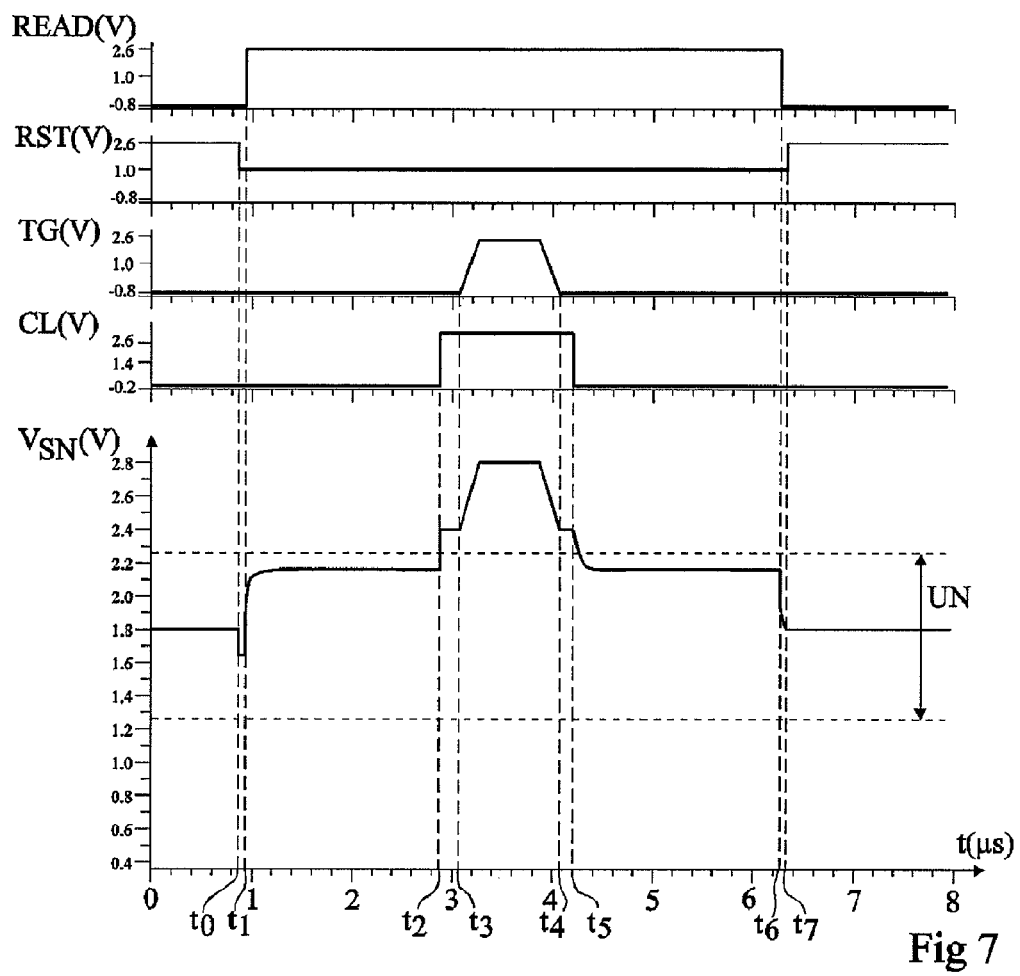
FIG. 7 is a timing diagram of voltages characteristic of the circuit of FIG. 5 for a second example of a control method according to an embodiment of the present invention.

FIG. 7 shows a timing diagram of voltages characteristic of the image sensor of FIG. 5 for a second control method adapted to the case where it is not desired to have supply voltage $V_{RT}$ temporarily switch to a high level higher than the normal operating level. In this case, supply voltage $V_{RT}$ is maintained at an average level, for example, 1.8 V. Further, in the second example of a control method, the low level of signal READ may be negative, for example equal to −0.6 V. The second control method is, between times $t_0$ and $t_7$, identical to the first control method example illustrated in FIG. 6.

Given the bias voltages of transistor $M_3$, said transistor is not necessarily perfectly conductive but only partially conductive (the transistor is said to be in cascode). For the second control method example, transistor $M_2$ operates in linear state when voltage $V_{SN}$ belongs to a range LIN of voltages between 1.25 V and 2.26 V.

The two previously-described control method examples illustrate different means that can be implemented to ensure for voltage $V_{SN}$ to be, outside of the charge transfer phase, in the voltage range LIN for which transistor $M_2$ is in linear state. The setting of the level of voltage $V_{SN}$ is obtained by adjusting parameters enabling increasing the level of voltage $V_{SN}$ or decreasing it. The parameters enabling increasing the level of voltage $V_{SN}$ are as follows:

an increase in voltage $V_{SN}$ is obtained by a capacitive coupling effect due to the stray capacitance between the conductive track transmitting signal READ and sense node SN by providing for sense node SN to be floating when signal READ switches from the low level to the high level;

an increase in voltage $V_{SN}$ is obtained by arranging read transistor $M_3$ between supply voltage $V_{RT}$ and transistor $M_2$ so that voltage $V_X$ rises when transistor $M_3$ turns on, which provides, by a coupling effect due to the stray capacitance between the source and the gate of transistor $M_2$, an increase in the voltage at read node $V_{SN}$;

an increase in voltage $V_{SN}$ is obtained by setting the low level of signal RST to a value greater than 0 V. This enables limiting, on turning-on of transistor $M_1$, the amplitude of the decrease of voltage $V_{SN}$ by coupling effect due to the stray capacitance between the gate and sense node SN;

an increase in voltage $V_{SN}$ is obtained by providing, before turning off of transistor $M_1$, a temporary increase in supply voltage $V_{RT}$ to a level greater than the average level. This provides an increase in the voltage at sense node SN at the time when transistor $M_1$ is off and sets the voltage at sense node SN;

an increase in voltage $V_{SN}$ is obtained by providing a negative low level for signal READ. This enables increasing the interval between the low level and the high level of signal READ so that, on switching from the low level to the high level, a greater increase in signal $V_{SN}$ by coupling effect due to the stray capacitance between the conductive track transmitting signal READ and sense node SN is obtained.

Parameters enabling decreasing the level of voltage $V_{SN}$ are the following:

- transistors $M_5$ and $M_6$ enable maintaining the voltage of read column COL at supply voltage $V_{RT}$ decreased by the drain-source voltages of both transistors $M_5$ and $M_6$. Voltages $V_1$ and BLTEo are at a high level. Transistors $M_5$ and $M_6$ turn on as soon as voltage $V_X$ decreases below voltage $V_1$ minus the threshold voltage of transistor $M_5$, voltage $V_X$ then settling at supply voltage $V_{RT}$ minus the drain-source voltages of both transistors $M_5$ and $M_6$. In this case, when transistor $M_3$ turns on, the variation of voltage $V_X$ is decreased since voltage $V_X$ is already greater than 0 V. The increase in voltage $V_{SN}$ which appears when voltage $V_X$ rises from a lower value, by capacitive effect due to the stray capacitance between the gate and the source of transistor $M_2$, is then limited.
- the low level of signal RST may be decreased to, when signal RST switches from the high level t the low level at the beginning of each read cycle, amplify the decrease of voltage $V_{SN}$ by capacitive coupling effect due to the stray capacitance between the gate of transistor $M_1$ and read node SN.

Figure 8:
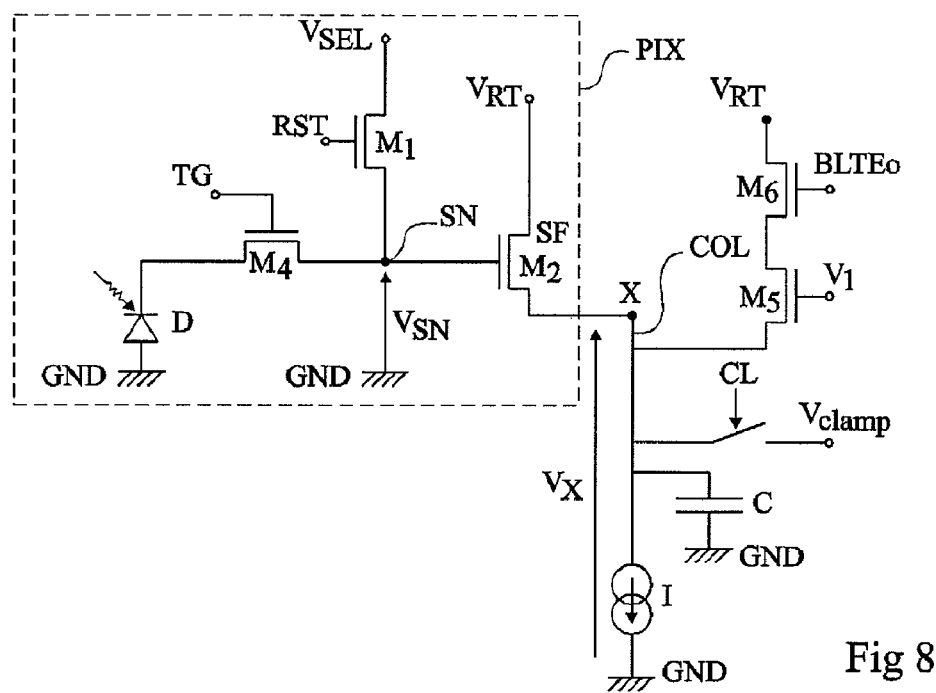
FIG. 8 is a second example of embodiment of an image sensor according to an embodiment of the present invention.

FIG. 8 shows a second example of embodiment of an image sensor according to an embodiment of the present invention. In the second embodiment, transistor $M_3$ is not present. The selection of pixel PIX is obtained by providing a source of an additional voltage $V_{SEL}$, the drain of transistor $M_1$ receiving voltage $V_{SEL}$. The rest of the circuit is identical to what has been previously described in relation with FIG. 5.

FIG. 9 shows a timing diagram of voltages characteristic of an example of a method for controlling the circuit of FIG. 8. Supply voltage $V_{RT}$ is constant, for example, on the order of 2.1 V. Before the beginning of a read cycle, voltage $V_{SEL}$ is at a low level, for example, 0.4 V. Signal RST is at a high level, for example, 2.5 V. Transistor $M_1$ is thus on and voltage $V_{SN}$ is substantially equal to voltage $V_{SEL}$. Transistors $M_5$ and $M_6$ are conductive to maintain voltage $V_X$ at a value which is not too low (in this case, 0.4 V) to avoid leakages at the level of transistor $M_2$. Little before time $t_0$, transistors $M_5$ and $M_6$ are off.

At time $t_0$, voltage $V_{SEL}$ switches from the low level to the high level, for example, 2.3 V, which corresponds to the selection of the photosensitive cell. This results in an increase in voltage $V_{SN}$ which settles at 2.1 V and an increase in voltage $V_X$ which settles at 1.1 V. Voltage $V_{SN}$ increases due to the fact that transistor $M_1$ is at least partially conductive and due to the capacitive coupling effect due to the stray capacitance between the drain and the source of transistor $M_1$.

Starting from time $t_1$, signal RST switches from the high level to the low level, causing the turning-off of transistor $M_1$. Voltage $V_{SN}$ decreases by a capacitive coupling effect due to the stray capacitance between the gate of transistor $M_1$ and node SN. Voltage $V_X$ follows voltage $V_{SN}$ and thus slightly decreases. Voltage $V_X$ is then stored by a processing circuit, not shown, connected to the column.

Between times $t_2$ and $t_6$, the control method is identical to the examples of control methods previously described in relation with FIGS. 6 and 7.

At time $t_6$, voltage $V_{SEL}$ switches from the high level to the low level. Voltage $V_{SN}$ then decreases by a coupling capacitive effect due to the stray capacitance between the gate of transistor $M_1$ and read node SN.

At time $t_7$, signal RST switches from the low level to the high level. Transistor $M_1$ thus turns on. Voltage $V_{SN}$ is maintained at the low level of $V_{SEL}$, voltage $V_X$ decreasing slower as capacitor C is discharged by current source I.

The second embodiment enables, by an accurate control of the high level of voltage $V_{SEL}$, exactly determining the level of signal $V_{SN}$ in read phases so that it is in the voltage range enabling for transistor $M_2$ to operate in linear state.

FIG. 10 illustrates an example of use of the image sensor according to an embodiment of the present invention. FIG. 10 very schematically shows a cell phone 10 comprising a package 12 at the level of which are arranged a screen 14 and a keyboard 16. Cell phone 10 also comprises an image acquisition system 18 comprising an optical system directing the light beams towards an image sensor according to an embodiment of the present invention.

Of course, the present invention is likely to have various alterations, modifications, and improvements which will readily occur to those skilled in the art. In particular, the present invention also applies to a photosensitive cell for which several photodiodes are connected to a same sense node. Further, although the present invention has been described for an image sensor cell in which the precharge device and the read device have a specific structure, the present invention also applies to a cell for which the precharge device or the read device have a different structure, for example, comprising a different number of MOS transistors.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for controlling an image sensor comprising an array of columns of photosensitive cells, each photosensitive cell of a same column being connected to a read column, said read column being connected to a processing circuit, at least one of the photosensitive cells comprising a photodiode capable of discharging into a sense node via a first MOS transistor, the sense node being connected to the gate of a second MOS transistor, wherein the second MOS transistor has a source directly connected to the read column without interposition of an intermediate MOS transistor, said device comprising a bias circuit adapted to increase the voltage of said read column during the discharge of the photodiode into the sense node, wherein the device is configured to change a bias of the sense node during a reset period of the sense node to a voltage level lower than a voltage level of the sense node at a start of the reset period.

2. The device of claim 1, further comprising a third MOS transistor connecting the sense node to a circuit for providing a reference voltage and a fourth MOS transistor connecting the drain of the second transistor to said circuit for providing the reference voltage, and means capable of successively turning off the third transistor and of turning on the fourth transistor before discharge of the photodiode into the sense node.

3. The device of claim 2, wherein the circuit for providing the reference voltage is adapted to temporarily increase the reference voltage before turning off of the third transistor.

4. The device of claim 1, wherein the processing circuit is adapted to store the voltage at the source of the second transistor, before and after discharge of the photodiode into the sense node.

5. The device of claim 1, wherein the drain of the second MOS transistor is connected to a circuit for providing a reference voltage, the device further comprising a third MOS transistor connecting the sense node to a circuit for providing a variable voltage, and means for successively turning on the third transistor, increasing the variable voltage up to a level greater than the reference voltage, and turning off the third transistor before discharge of the photodiode into the sense node.

6. The device of claim 2, wherein the bias circuit comprises a switch connecting the source of the second transistor to a source of a voltage greater than the reference voltage decreased by the gate-source voltage of the second transistor.

7. The device of claim 5, wherein the bias circuit comprises a switch connecting the source of the second transistor to a source of a voltage greater than the reference voltage decreased by the gate-source voltage of the second transistor.

8. An optical device, such as a film camera, a camcorder, a cellular phone, or a digital photographic device, comprising an image sensor and a device for controlling the image sensor as claimed in claim 1.

9. A method for controlling an image sensor comprising an array of columns of photosensitive cells, each photosensitive cell of a same column being connected to a read column, said read column being connected to a processing circuit, at least one of the photosensitive cells comprising a photodiode capable of discharging into a sense node via a first MOS transistor, the sense node being connected to the gate of a second MOS transistor, wherein the second MOS transistor has a source directly connected to the read column without interposition of an intermediate MOS transistor, said method comprising:
increasing the voltage of said read column during the discharge of the photodiode into the sense node; and
changing a bias of the sense node during a reset period of the sense node to a voltage level lower than a voltage level of the sense node at a start of the reset period.

10. The method of claim 9, wherein the photosensitive cell further comprises a third MOS transistor connecting the sense node to a circuit for providing a reference voltage and a fourth MOS transistor connecting the drain of the second transistor to said circuit for providing the reference voltage, the method further comprising successively turning off the third transistor and of turning on the fourth transistor before the discharge of the photodiode into the sense node.

11. The method of claim 9, wherein the drain of the second MOS transistor is connected to a circuit for providing a reference voltage, the photosensitive cell including a third MOS transistor connecting the sense node to a circuit for providing a variable voltage, the method further comprising successively turning on the third transistor, increasing the variable voltage up to a level higher than the reference voltage and turning off the third transistor before discharge of the photodiode to the sense node.

12. The method of claim 10, wherein, during the discharge of the photodiode to the sense node, the source of the second transistor is connected to a circuit for providing a voltage greater than the reference voltage decreased by the gate-source voltage of the second transistor.

13. The method of claim 11, wherein, during the discharge of the photodiode to the sense node, the source of the second transistor is connected to a circuit for providing a voltage greater than the reference voltage decreased by the gate-source voltage of the second transistor.

14. The method of claim 9, wherein the increasing the voltage of the read column occurs prior to transferring charge from the photodiode to the sense node.

15. The method of claim 14, further comprising:
decreasing the voltage of the read column after transferring charge from the photodiode to the sense node; and
reading a voltage value from the read column representative of a number of transferred charges.

16. The method of claim 14, wherein the reading occurs after decreasing the voltage.

17. An image sensor comprising:
a photosensitive cell having a photodiode configured to discharge into a sense node via a first MOS transistor;
a second MOS transistor having a gate coupled to the sense node and a source directly connected to a read column without interposition of an intermediate MOS transistor; and
a bias circuit adapted to increase a voltage of the read column during the discharge of the photodiode into the sense node, wherein the image sensor is configured to change a bias of the sense node during a reset period of the sense node to a voltage level lower than a voltage level of the sense node at a start of the reset period.

18. The image sensor of claim 17, wherein the image sensor is adapted to temporarily increase the bias of the sense node to a voltage level greater than a final voltage level of the sense node at an end of the reset period before the end of the reset period.

19. The image sensor of claim 17, wherein the bias circuit comprises a switch configured to couple the read column to a voltage supply.

20. The image sensor of claim 17, disposed in a camera, camcorder, cellular phone, or digital photographic device.

* * * * *